(12) United States Patent
Xiao et al.

(10) Patent No.: US 10,496,483 B2
(45) Date of Patent: Dec. 3, 2019

(54) METHOD AND APPARATUS FOR REBUILDING REDUNDANT ARRAY OF INDEPENDENT DISKS

(71) Applicant: EMC IP Holding Company LLC, Hopkinton, MA (US)

(72) Inventors: Huibing Xiao, Beijing (CN); Geng Han, Beijing (CN); Jian Gao, Beijing (CN); Hongpo Gao, Beijing (CN); Jibing Dong, Beijing (CN); Shaoqin Gong, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 269 days.

(21) Appl. No.: 15/464,275

(22) Filed: Mar. 20, 2017

(65) Prior Publication Data

US 2017/0270018 A1 Sep. 21, 2017

(30) Foreign Application Priority Data

Mar. 21, 2016 (CN) .......................... 2016 1 0162005

(51) Int. Cl.
*G06F 11/10* (2006.01)
*G06F 3/06* (2006.01)

(52) U.S. Cl.
CPC ........ *G06F 11/1092* (2013.01); *G06F 3/0617* (2013.01); *G06F 3/0644* (2013.01); *G06F 3/0689* (2013.01); *G06F 2211/1028* (2013.01)

(58) Field of Classification Search
CPC ............. G06F 11/1076; G06F 11/1088; G06F 11/1092; G06F 11/2053; G06F 11/2069; G06F 11/2094; G06F 3/0644; G06F 3/0689; G06F 2211/1028; G06F 2211/104
See application file for complete search history.

(56) References Cited

U.S. PATENT DOCUMENTS

| | | | | |
|---|---|---|---|---|
| 5,357,509 | A * | 10/1994 | Ohizumi | ............... G06F 3/0601 714/6.32 |
| 5,574,851 | A * | 11/1996 | Rathunde | ............. G06F 3/0604 711/114 |
| 5,657,439 | A * | 8/1997 | Jones | .................. G06F 11/1076 711/165 |
| 7,386,666 | B1 * | 6/2008 | Beauchamp | ........ G06F 11/2094 711/114 |
| 8,099,623 | B1 * | 1/2012 | Li | ....................... G06F 11/1084 714/6.22 |
| 8,874,494 | B1 | 10/2014 | Evans | |
| 9,354,975 | B2 | 5/2016 | Aliev et al. | |

(Continued)

*Primary Examiner* — Gabriel Chu
(74) *Attorney, Agent, or Firm* — BainwoodHuang

(57) ABSTRACT

Embodiments of the present disclosure relate to a method and apparatus for rebuilding redundant array of independent disks (RAID). The method comprises dividing a RAID group including a disk into a plurality of stripes in response to detecting a failure of the disk, and each stripe includes a disk slice across all disks of the RAID group. The method further comprises mapping the plurality of stripes to other RAID groups respectively and rebuilding data on the plurality of stripes in other RAID groups. Embodiments of the present disclosure rebuild in parallel the stripes of the failed RAID group in other RAID groups, thereby effectively increasing the rebuilding speed for RAID and ensuring reliability of the RAID group.

20 Claims, 7 Drawing Sheets

(56) References Cited

U.S. PATENT DOCUMENTS

| | | |
|---|---|---|
| 9,690,660 B1 | 6/2017 | Robins et al. |
| 9,804,939 B1 | 10/2017 | Bono et al. |
| 9,880,764 B1 | 1/2018 | Xu et al. |
| 9,921,912 B1 | 3/2018 | Vankamamidi et al. |
| 10,013,323 B1 | 7/2018 | Puhov et al. |
| 10,089,015 B1 | 10/2018 | Gao et al. |
| 10,089,026 B1 | 10/2018 | Puhov et al. |
| 10,146,456 B1 | 12/2018 | Gao et al. |
| 2003/0188101 A1* | 10/2003 | Fore .................. G06F 3/0601 711/114 |
| 2006/0041793 A1* | 2/2006 | Cherian ............ G06F 11/1088 714/47.1 |
| 2008/0126842 A1* | 5/2008 | Jacobson ........... G06F 11/1662 714/6.12 |
| 2009/0177918 A1* | 7/2009 | Abali ................. G06F 11/1092 714/6.32 |
| 2013/0073900 A1* | 3/2013 | Li ....................... G06F 11/1092 714/6.22 |
| 2013/0275802 A1* | 10/2013 | Endo ................. G06F 11/1076 714/6.23 |
| 2016/0050146 A1* | 2/2016 | Henderson ......... H04L 67/1097 370/392 |

* cited by examiner

METHOD AND APPARATUS FOR REBUILDING REDUNDANT ARRAY OF INDEPENDENT DISKS

RELATED APPLICATIONS

This application claim priority from Chinese Patent Application Number CN201610162005.3, filed on Mar. 21, 2016 at the State Intellectual Property Office, China, titled "Method and Apparatus for Rebuilding Redundant Array of Independent Disks" the contents of which is herein incorporated by reference in its entirety.

FIELD

Embodiments of the present disclosure generally relate to technology of disk failure handling, and more specifically to a method and apparatus for rebuilding redundant array of independent disks (RAID).

BACKGROUND

Redundant Array of Independent Disks (RAID) is a disk group consisting of a plurality of independent disks, which provides larger storage space and more reliable performance than a single disk. In order to recover data when a disk fails, one (for example in RAID3 or RAID5) or more (for example in RAID6) parity disks are provided in the RAID. However, the reliability of the RAID can be degraded greatly when one or more disks fail in the RAID.

Generally, if one disk in the RAID fails, RAID enters into a degraded mode and utilizes a spare disk to rebuild the RAID. However, since each disk has a limited band width and limited input/output operations per second (IOPS) and the disk capacity is usually high (for example 2T or 4T). Thus, it often causes a time ranging from several days to several weeks for rebuilding the RAID, which makes it very hard to meet high reliability demand.

SUMMARY

In light of the above, embodiments of the present disclosure provide a method and apparatus for rebuilding redundant array of independent disks (RAID). Embodiments of the present disclosure divide the RAID group including the failed disk into a plurality of stripes and rebuild in parallel the plurality of stripes of the failed RAID group in other RAID groups, thereby effectively increasing the rebuilding speed for RAID and ensuring reliability of the RAID group.

According to one aspect of the present disclosure, there is provided a method for rebuilding redundant array of independent disks (RAID). The method comprises: in response to detecting a failure of a disk, dividing a RAID group including the disk into a plurality of stripes, wherein each stripe includes a disk slice across all disks of the RAID group; mapping the plurality of stripes to other RAID groups, respectively; and rebuilding, in the other RAID groups, data on the plurality of stripes in the RAID group.

According another aspect of the present disclosure, there is provided an apparatus for rebuilding redundant array of independent disks (RAID). The apparatus comprises: a dividing unit configured to, in response to detecting a failure of a disk, divide a RAID group including the disk into a plurality of stripes, wherein each stripe includes a disk slice across all disks of the RAID group; a mapping unit configured to map the plurality of stripes to other RAID groups respectively; and a rebuilding unit configured to rebuild, in the other RAID groups, data on the plurality of stripes in the RAID group.

According to a further aspect of the present disclosure, there is provided an apparatus for rebuilding redundant array of independent disks (RAID). The apparatus comprises: a memory and a processor coupled to the memory. The processor is configured to: in response to detecting a failure of a disk, divide a RAID group including the disk into a plurality of stripes, wherein each stripe includes a disk slice across all disks of the RAID group; map the plurality of stripes to other RAID groups, respectively; and rebuild, in the other RAID groups, data on the plurality of stripes in the RAID group.

BRIEF DESCRIPTION OF THE DRAWINGS

Through the following detailed description with reference to the accompanying drawings, features, advantages and other aspects of various embodiments of the present disclosure will become more apparent. Several example embodiments of the present disclosure will be illustrated by way of example but not limitation in the drawings in which.

DETAILED DESCRIPTION OF EMBODIMENTS

Figure 1:
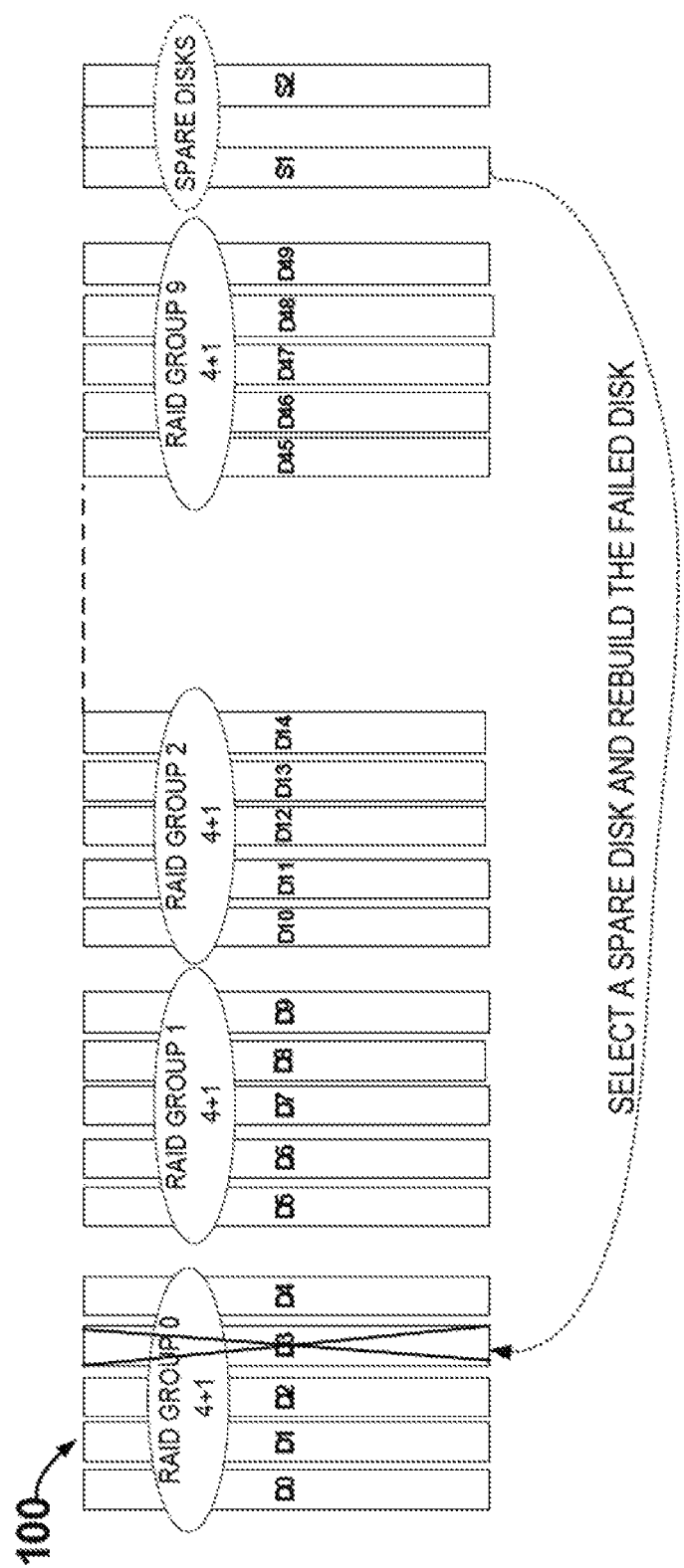
FIG. 1 illustrates a schematic diagram of a rebuilding process in the existing RAID storage system.

Example embodiments of the present disclosure are described with reference to the drawings. Flowcharts and block diagrams in the drawings illustrate system structure, functions and operations that may be implemented by the method and system according to embodiments of the present disclosure. It should be noted that each block in the flowchart and the block diagram can represent a module, a program section, or a part of the code. The module, the program section or the part of the code can comprise one or more executable instructions for implementing logic functions specified in each embodiment. It should also be appreciated that the functions indicated in the blocks can also occur in a sequence different from the one indicated in the drawings in some alternative implementations. For example, the two blocks in succession can be executed basically in parallel or in a reverse order depending on the involved functions. Also note that each block and combinations of blocks in the flowchart and/or block diagram can be implemented by specific hardware-based system that executes specified functions or operations or the combinations of specific hardware and computer instructions.

As used herein, the terms "comprises" and "includes" and its variants are to be read as open-ended terms that mean "includes, but is not limited to." The term "based on" is to be read as "based at least in part on." The term "one example embodiment" is to be read as "at least one example embodiment." The term "a further example embodiment" is to be read as "at least a further example embodiment." Definitions of other terms will be described in the following description.

It should be appreciated that the example embodiments are provided for those skilled in the art to better understand and implement embodiments of the present disclosure, rather than limiting the scope of the present invention in any ways.

FIG. 1 illustrates a schematic diagram of a rebuilding process in the existing RAID storage system 100. The RAID storage system in FIG. 1 comprises 10 RAID groups (for example, a RAID group 1, a RAID group 2 . . . a RAID group 9) and 2 spare disks (for example disk S1, S2), and each RAID group comprises 4+1 disks (for example 4 data disks and 1 parity disk). At a certain time, when disk D3 in the RAID group 0 fails, the spare disk S1 is usually selected to add into the RAID group 0 so as to replace the failed disk D3, and data is rebuilt for the RAID group 0. However, in the process of rebuilding the RAID group 0, if any further disk (for example disk D2) in the RAID group 0 also fails, then the entire storage system will break down. Besides, in the process of rebuilding RAID group 100 shown in FIG. 1, only one spare disk S1 is involved in rebuilding. Therefore, the rebuilding speed is quite slow, which normally takes several days or even several weeks for example.

Figure 2:
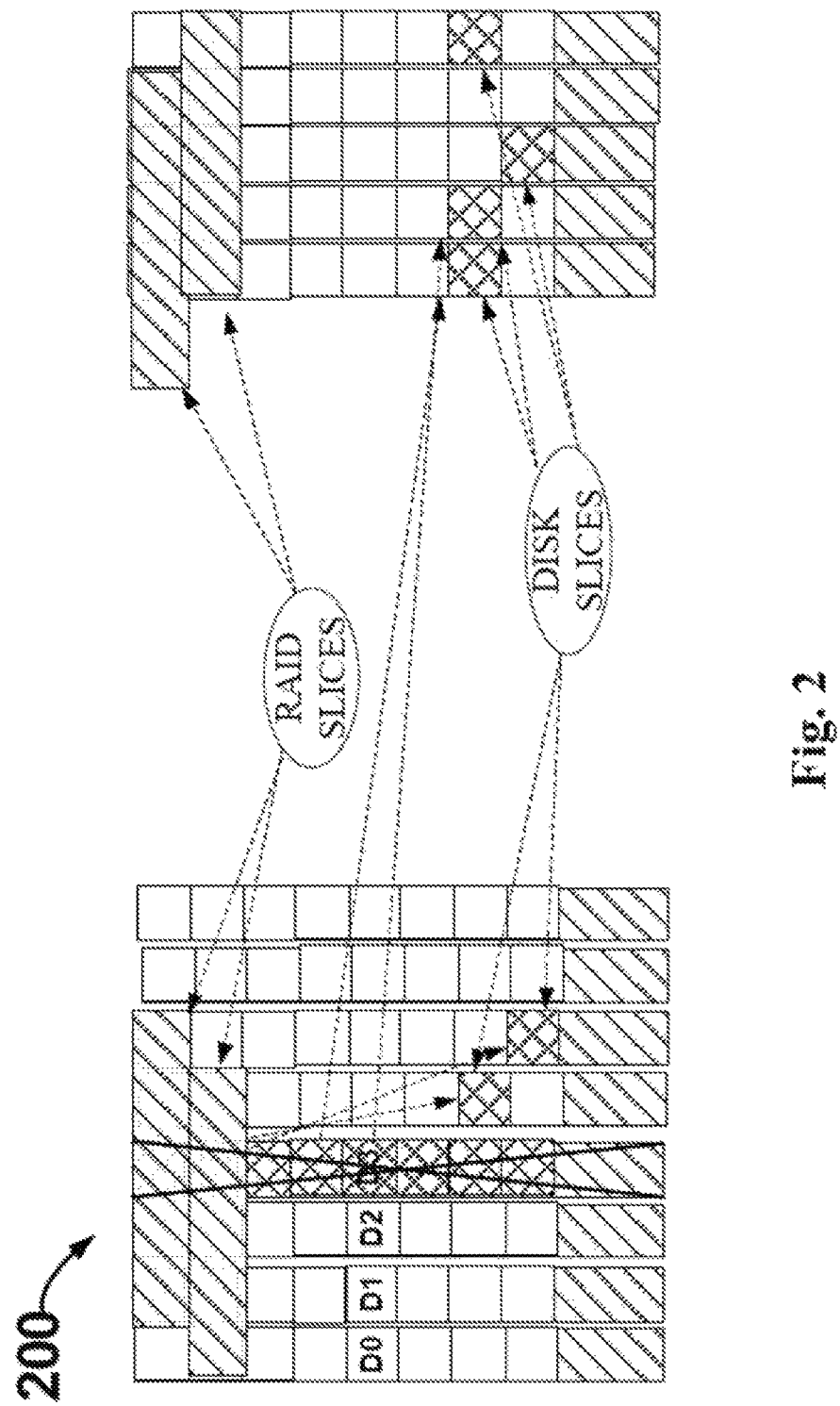
FIG. 2 illustrates another example of a rebuilding process in the existing RAID storage system.

FIG. 2 illustrates another example of a rebuilding process in the existing RAID storage system 200. The RAID storage system 200 in FIG. 2 comprises a plurality of disks, such as disks D0, D1, D2, D3 and so on. Each disk is divided into a plurality of disk slices in a mapping way, and the RAID is divided into a plurality of RAID slices at the same time. A plurality of disk slices and a plurality of RAID slices are randomly selected to form a specific RAID slice. In the RAID storage system 200 in FIG. 2, when the disk D3 fails, the disk D3 is divided into a plurality of disk slices and the RAID group is divided into a plurality of disk slices. Then, the disk slices or the RAID slices are mapped to other disks or RAID groups for rebuilding. FIG. 2 shows a fully meshed rebuilding method in a mapping way, which includes the disk slices mapping and the RAID slices mapping. However, the completely randomly selected rebuilding method in FIG. 2 disrupts and weakens the entire storage system 200. In the process of rebuilding a certain failed disk, the failure of any further disk in the RAID storage system 200 (for example a fault of a second disk) will result into the failure of the whole storage system.

It is seen that in the rebuilding method of FIG. 1, the entire storage system fails only when the RAID group including the failed disk has a further failed disk. However, in the fully meshed rebuilding method of FIG. 2, the failure of any second disk in the storage system will break down the entire storage system. Therefore, although the rebuilding method of FIG. 2 increases rebuilding speed, it also degrades the reliability of the entire storage system.

For example, when the RAID storage system 200 in FIG. 2 is a storage system including N disks, assuming that the failure rate of a single disk is T, the probability for the storage system transitioning from optimal state (no disk failure) to a degraded state (one disk failure) is N×T, and the probability for the storage system transitioning from the degraded state to a failure state (2 disk failures) is (N−1)×T. Accordingly, due to the constant growth of disk numbers N in the storage system, the probability that the second failed disk results into the failure of the entire storage system linearly increases.

With the constant growth of disk numbers in the storage system, the failure probability of the entire storage system also increases. Therefore, in order to reach the same reliability level, the rebuild speed and the bandwidth of the disk must be continually improved. The following table I shows the rebuild speed and the bandwidth of the read operation of each disk in the same reliability condition.

TABLE 1

Rebuild speed and bandwidth demand by the same reliability

| | Disk number | | | |
|---|---|---|---|---|
| | 5 | 10 | 15 | 20 |
| Rebuild rate (MB/s) | 50 | 225 | 525 | 950 |
| Rebuild ratio scale | 1 | 4.5 | 10.5 | 19 |
| Bandwidth of the read operation of each disk (MB/s) | 40 | 90 | 140 | 190 |

Therefore, as the disk number grows, the traditional method in FIG. 2 needs a higher rebuilding rate and a wider bandwidth to reach the same reliability. However, the increase of the rebuilding rate demands a large amount of costs and the bandwidth of each disk is limited. Hence, the traditional method of FIG. 2 fails to ensure the reliability of the storage system while increasing the rebuilding speed.

Figure 3:
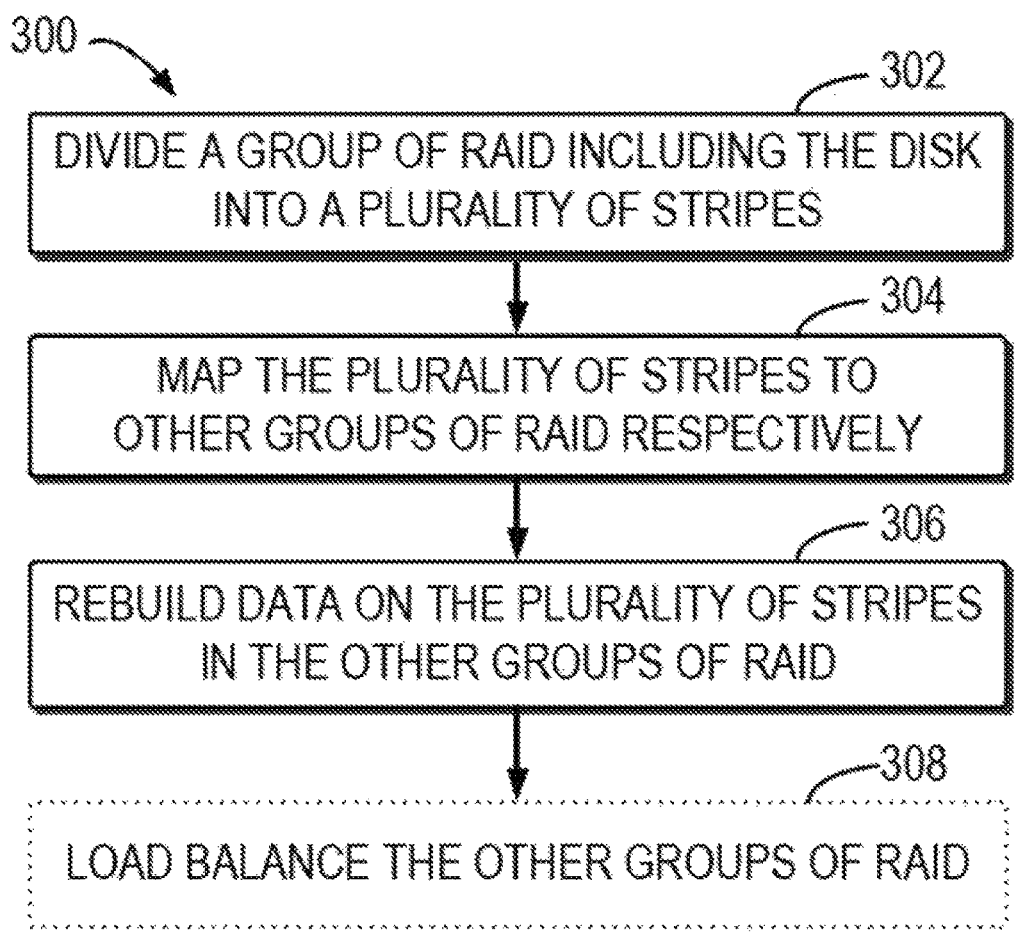
FIG. 3 illustrates a flowchart of a method for rebuilding RAID according to the embodiments of the present disclosure.

FIG. 3 illustrates a flowchart of a method 300 for rebuilding RAID according to the embodiments of the present disclosure. At 302, if a disk in a RAID group fails, then the RAID group is divided into a plurality of stripes, and each stripe comprises a disk slice across all disks in the RAID group, that is a RAID slice. For example, when a certain disk in the RAID breaks down, the entire RAID is divided according to stripes, and each stripe comprises a disk slice of each disk at the same position in the RAID.

In one embodiment, if the disk fails, then the RAID group may be divided into a plurality of stripes according to the predetermined size of each stripe. For example, different stripe sizes are configured for different data types (for example a document file, or a streaming media). Based on the size of each stripe and the total storage space of the RAID group, the RAID is divided into a corresponding number of stripes.

At 304, the plurality of stripes in the RAID group is mapped to other RAID groups respectively. In one embodiment, the plurality of stripes are evenly migrated into other RAID groups. In another embodiment, the plurality of stripes are mapped to the other RAID groups respectively based on the workload and remaining storage space of each of the other RAID groups. For example, for the RAID groups with smaller workload, it means that the IO operations are less frequent and the IO bandwidth left is relatively wider, and thus the plurality of stripes may be mapped to the RAID groups. As another example, for the other RAID groups with more left storage space, it means the RAID groups can still store more data and the plurality of stripes may be mapped to those RAID groups.

At 306, data on the plurality of stripes of the RAID group is rebuilt in other RAID groups. In one embodiment, if the specific stripe in the plurality of stripes is being rebuilt, then the specific stripe in the degraded RAID group only provides a read operation without providing any write operation. That is, the stripe being rebuilt in the RAID group only provides the read operation, and the write operation is redirected to the specific RAID group that rebuilds the specific stripe. In one embodiment, after the specific stripe is rebuilt, both read and write operations for the specific stripe are redirected to the specific RAID group that rebuilds the specific stripe. That is, after the specific stripe has been rebuilt, the specific stripe in the RAID group no longer provides read and write operations, and all of the read and write operations are redirected to the specific RAID group that has rebuilt the specific stripe. Therefore, when more and more stripes are rebuilt, the rebuilding speed for the failed RAID group gets faster.

In some embodiments, a plurality of stripes are rebuilt by parallel in a plurality of RAID groups from the other RAID groups. For instance, if a plurality of stripes are mapped to a plurality of other RAID groups, stripes in the failed RAID group are rebuilt in parallel in a plurality of RAID groups. In this way, the rebuilding by simultaneous use of a plurality of RAID groups can effectively improve the rebuilding speed for the failed RAID group.

In one embodiment, metadata may be used to assist identifying the mapping relationship between stripes (or disk slices) and other RAID groups. In another embodiment, the stripes in the RAID group are rebuilt segment by segment, and a check point may be set to record the progress of segment rebuilding. The metadata, mapping table and checkpoint information can be stored in a persistent memory for safe and quick access.

In some embodiments, if all of the plurality of stripes has been rebuilt, the failed disk may be replaced with a spare disk to form a new spare RAID group. If the degraded RAID group is rebuilt, then data in the degraded RAID group will be cleared. At this time, a further spare disk is combined with the disks without a failure in the RAID group to form a new spare RAID group.

In some embodiments, method 30 may optionally comprise 308, in which load balancing is performed on other RAID groups after forming the new spare RAID group. For example, a portion of data of the RAID group in the other RAID groups which has a greater load is migrated to the new spare RAID group. In some embodiments, the RAID group having a greater load is determined by recording the counts of read and/or write operations performed in each of the other RAID groups. In some embodiments, when some new disks are placed in the storage system, the above load balancing operation may also be executed.

In the rebuilding method 300 for RAID of the present disclosure, the stripes in the RAID group act as a unit for rebuilding, and data on the stripes of the failed RAID are rebuilt in parallel in a plurality of other RAID groups, thereby improving the rebuilding speed for RAID. Meanwhile, by use of rebuilding the entire stripe, one disk fault in other RAID groups will not result into failure of the whole storage system. In other words, it is only when a further disk fails in the failed RAID that the entire storage system will break down. Therefore, the rebuilding method 300 for RAID in the present disclosure not only improves the rebuilding speed, but also ensures the reliability of the storage system.

According to the rebuilding method 300 for RAID in the present disclosure, in a storage system of RAID 5, in the case that the rebuilding rate is 50 MB/s and each disk size is 3 TB, it only needs 16 hours to complete the rebuild process. Thus, embodiments of the present disclosure can meet reliability targets and guarantee load balancing of the storage system.

Figure 4:
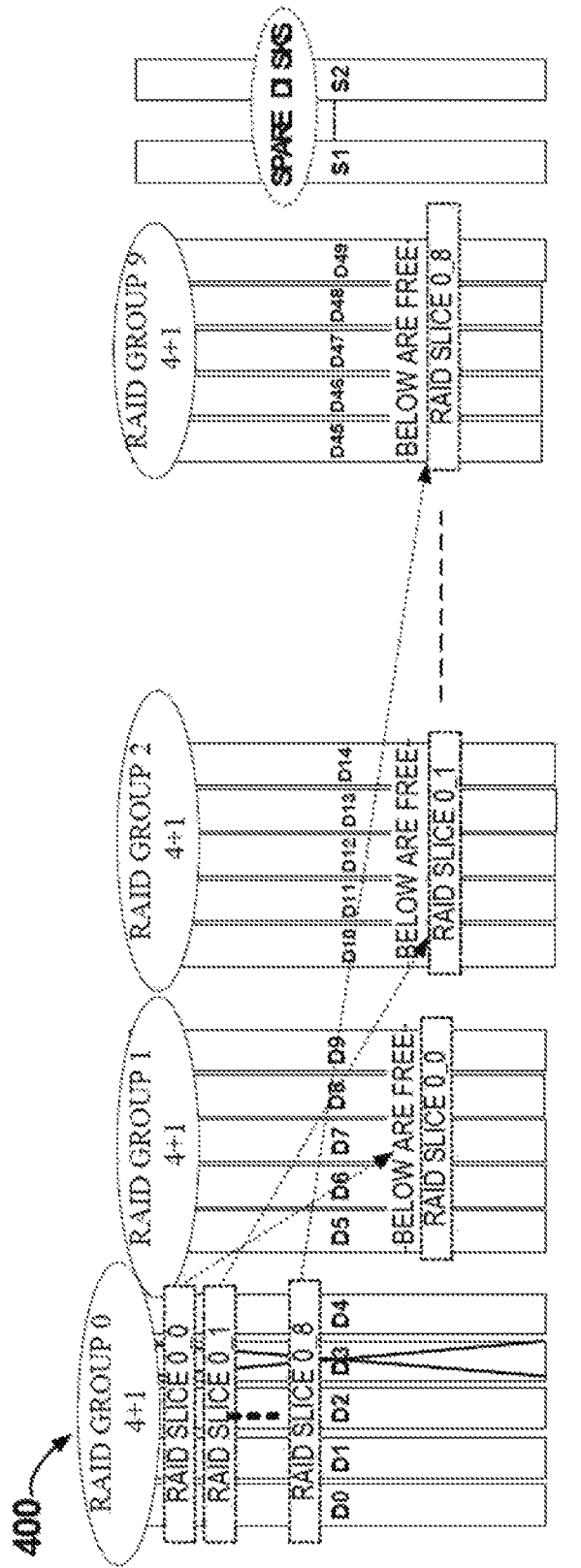
FIG. 4 illustrates a schematic diagram of a rebuilding process in the RAID storage system according to the embodiments of the present disclosure.
Figure 5:
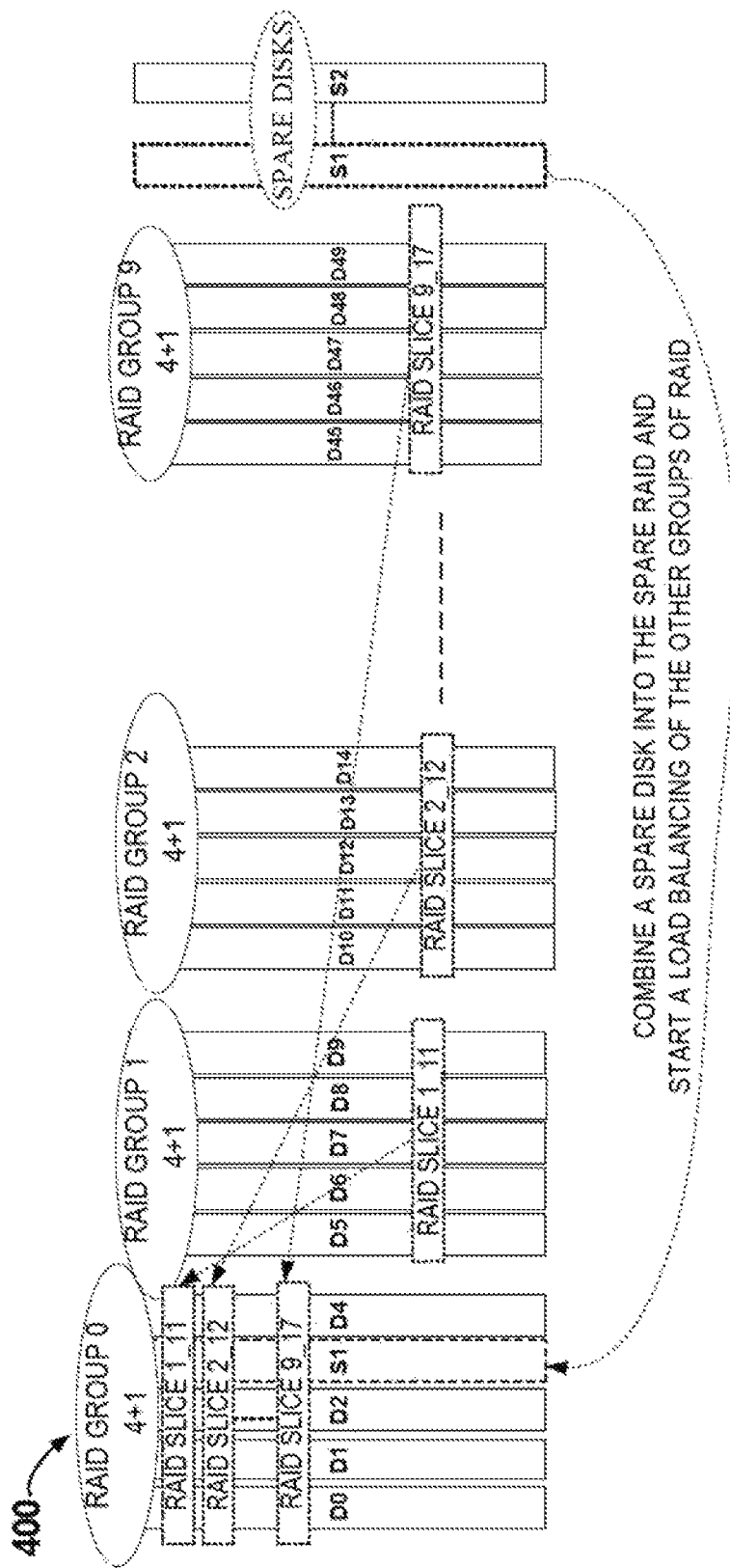
FIG. 5 illustrates a schematic diagram of a load balancing process in the RAID storage system according to embodiments of the present disclosure.

FIGS. 4 and 5 show examples of the rebuilding method 300 for RAID according to the present disclosure without the limit of the rebuilding method 300 for RAID in the present disclosure.

FIG. 4 illustrates a schematic diagram of a rebuilding process in the RAID storage system 400 according to embodiments of the present disclosure. For example, the storage system 400 may comprise 10 RAID groups (for example RAID group 1, RAID group 2 . . . RAID group 9) and 2 spare disks (for example disk S1, disk S2), and each RAID group includes 4+1 disks (for example 4 data disks and 1 parity disk). If the disk D3 in the RAID group 0 fails, the RAID group 0 is divided into for example 9 stripes according to the rebuilding method 300 for RAID of the present disclosure. That is, a RAID slice 0_0, a RAID slice 0_1 . . . a RAID slice 0_8, and each stripe represents one RAID slice. Then, 9 stripes of the RAID group 0 are mapped to RAID group 1, RAID group 2 . . . RAID group 9 respectively, and they are rebuilt in parallel in the RAID group 1, RAID group 2 . . . RAID group 9. Although FIG. 4 illustrates a mapping relationship, different mapping relationships may be also configured based on the workload and remaining storage space for each of the other RAID groups.

FIG. 5 illustrates a schematic diagram of a load balancing process in the RAID storage system 400 according to embodiments of the present disclosure. After the 9 stripes in FIG. 4 have been rebuilt, data in the disks D0, D1, D2 and D4 of the RAID group 0 has been cleared. Then, the failed disk D3 is replaced by the new spare disk S1 to form a new spare RAID group 0', which includes the disk D0, D1, D2, S1 and D4.

In a load balancing process of the RAID storage system 400 shown in FIG. 5, in the case that the degraded RAID group 0 is rebuilt, data in the degraded RAID group is cleared. Therefore, to maintain the load balancing of the entire storage system, the RAID slice 1_11 in the RAID group 1, the RAID slice 2_12 in the RAID group 2 . . . and the RAID slice 9_17 in the RAID group 9 may be migrated into the new spare RAID group 0', in order to realize load balancing of the whole storage system.

Figure 6:
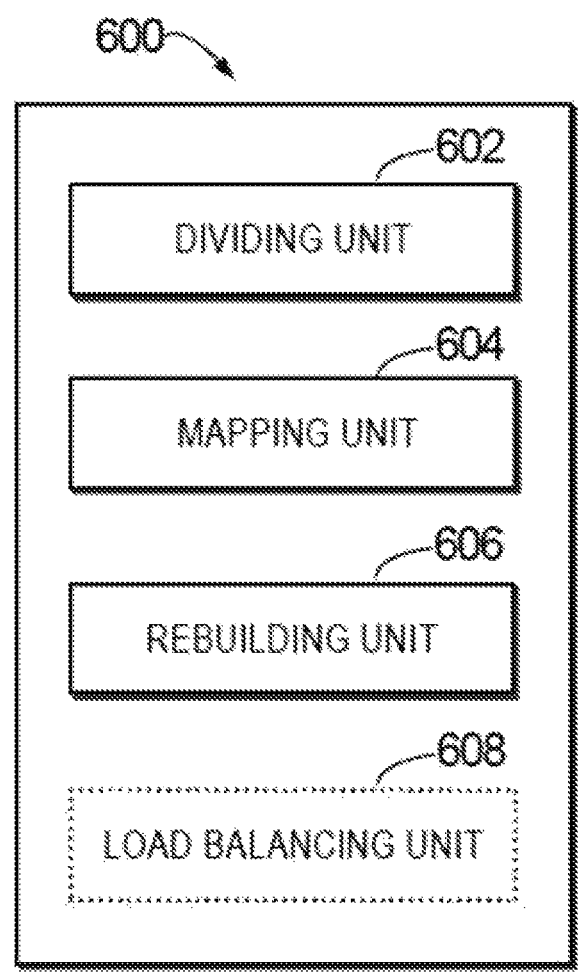
FIG. 6 illustrates a block diagram of an apparatus for rebuilding RAID according to embodiments of the present disclosure.

FIG. 6 illustrates a block diagram of an apparatus 600 for rebuilding RAID according to embodiments of the present disclosure. The apparatus 600 comprises a dividing unit 602 configured to, in response to detecting a failure of a disk, divide a RAID group including the disk into a plurality of stripes, and each stripe includes a disk slice across all disks of the RAID group. The apparatus 600 further comprises a mapping unit 604 configured to map the plurality of stripes to other RAID groups respectively. The apparatus 600 also comprises a rebuilding unit 606 configured to rebuild, in the other RAID groups, data on the plurality of stripes in the RAID group.

In one embodiment, the dividing unit 602 is further configured to divide the RAID group into the plurality of stripes according to a predetermined size of a stripe. In another embodiment, the mapping unit 604 is further configured to map the plurality of stripes to the other RAID groups respectively based on a workload and a remaining storage space of each of the other RAID groups.

In one embodiment, the rebuilding unit 606 is further configured to, in response to determining that a specific stripe of the plurality of stripes is being rebuilt, provide a read operation for the specific stripe in the RAID group without providing a write operation for the specific stripe. In another embodiment, the rebuilding unit 606 is further configured to redirect both read and write operations for the specific stripe to a specific RAID group rebuilding the specific stripe after the specific stripe is rebuilt.

In one embodiment, the rebuilding unit 606 is further configured to rebuild the plurality of stripes in parallel in a plurality of RAID groups of the other RAID groups. In another embodiment, the rebuilding unit 606 is further configured to rebuild the plurality of stripes in the RAID group segment by segment and to set a check point to record a progress of the rebuilding.

In one embodiment, the apparatus 600 further comprises a replacing unit configured to, in response to all of the plurality of stripes having been rebuilt, replace the failed disk with a spare disk to form a new spare RAID group.

In one embodiment, the apparatus 600 can further comprise a load balancing unit 608 configured to load balance the other RAID groups after forming the new spare RAID group. In another embodiment, the load balancing unit 608 is further configured to migrate a portion of data of a specific group of the other RAID groups which has a high load to the new spare group of RAID. In a further embodiment, the load balancing unit 608 is further configured to determine the specific group of RAID of the other RAID groups which has the high load by recording, in each of the other RAID groups, counts of at least one of a read operation or a write operation.

It should be understood the apparatus 600 can be implemented by various manners. For example, in some embodiments, the apparatus can be implemented by hardware, software or combinations of hardware and software, wherein hardware can be implemented by specific logic and software can be stored in the memory and executed by an appropriate instruction execution system, such as microprocessor or specifically designed hardware. Those skilled in the art can understand that the above method and system can be implemented using computer executable instructions and/or control codes included in the processor, such as carrier medium for disks, CD or DVD-ROM, programmable memory for read-only memory, or codes provided on the data carrier of the optical or electrical signal carriers. The means and apparatus of the embodiments of the present disclosure can be implemented not only by super-large-scale integration or gate array, such as logic chip, semiconductors (for example diodes), or field-programmable gate array or hardware circuit of the programmable hardware device for the programmable logic devices, but also by software executed by various types of processors and the combination of the above hardware circuits and software.

Figure 7:
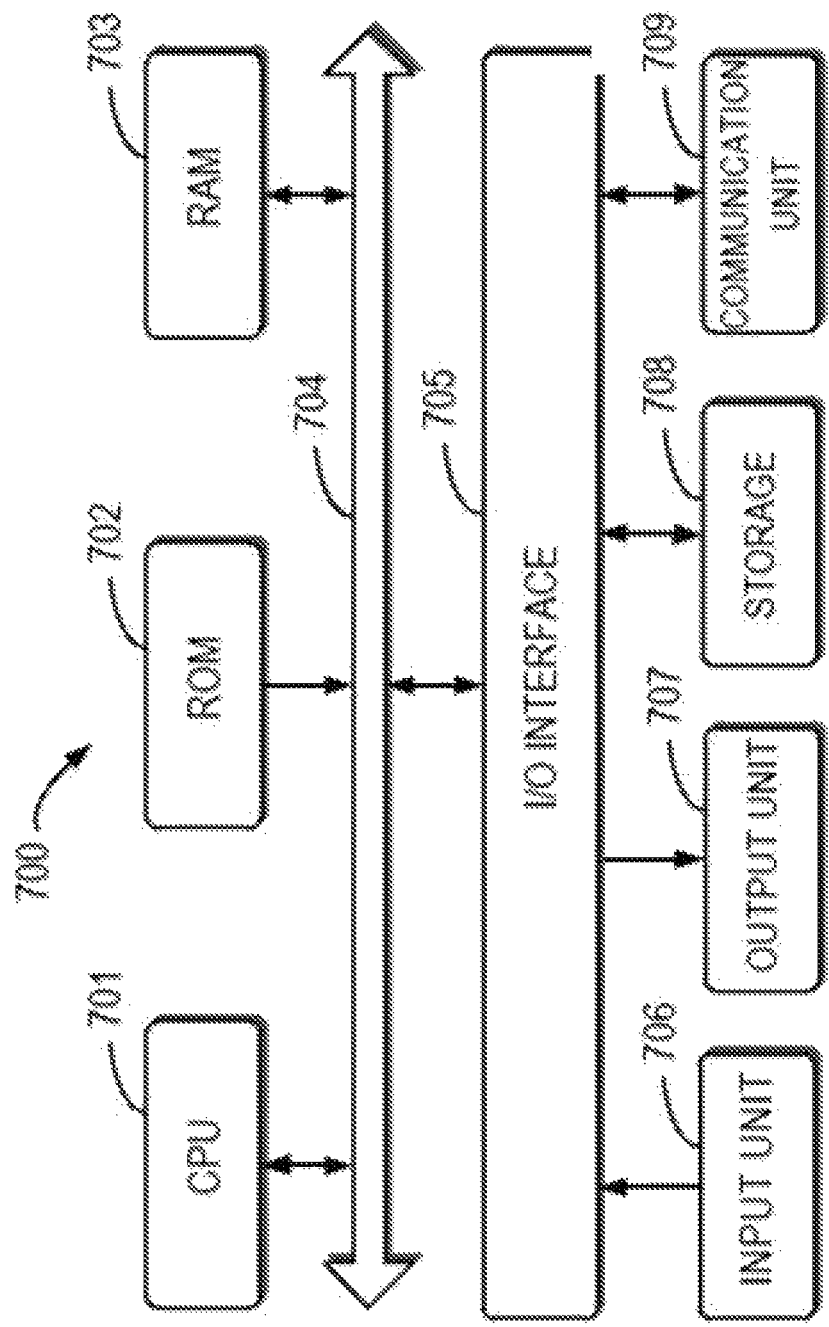
FIG. 7 illustrates a schematic block diagram of an apparatus 700 for implementing embodiments of the present disclosure.

FIG. 7 illustrates a schematic block diagram of an apparatus 700 for implementing embodiments of the present disclosure. As shown in FIG. 7, the apparatus 700 comprises a central processing unit (CPU) 701 which executes various appropriate actions and processing according to the computer program instructions stored in the read-only memory (ROM) 702 or computer program instructions loaded from the storage unit 708 to the random-access memory (RAM) 703. The RAM 703 can also store all kinds of programs and data required for operating the apparatus 700. The CPU 701, ROM 702 and RAM 703 are connected with each other via the bus 704. Input/output (I/O) interface 705 is also connected to the bus 704.

Multiple components in the apparatus 700 are connected to the I/O interface 705, comprising: an input unit 706, such as keyboard and mouse and so on; an output unit 707, such as a various of displays and loudspeakers; a storage unit 708, such as disk and optical disc; and a communication unit 709, such as network card, modem, wireless communication transceiver. The communication unit 709 allows the apparatus 700 to exchange information/data with other apparatuses via a computer network and/or various telecommunication networks, such as Internet.

The process and handling method described above, such as method 300, may be executed by the processing unit 701. For example, in some embodiments, the method can be implemented as a computer software program, which is tangibly included in the machine-readable medium, such as storage unit 708. In some embodiments, the computer program can be partially or fully loaded and/or mounted on the apparatus 700 via the ROM 702 and/or the communication unit 709. The computer program, when loaded to the RAM 703 and executed by the CPU 701, may implement one or more actions of the above described method 300.

It should be noted that although the above detailed description mentions a plurality means or sub-means for the apparatus, such division is only exemplary without any restrictive intentions. In fact, according to the embodiments of the present disclosure, features and functions of two or more means described above may be embodied in one means, and the features and functions of the above described apparatus may be further divided and embodied by the plurality of means.

The above description is optional embodiments of the present disclosure and is not intended to limit the embodiments of the present disclosure. For those skilled in the art, embodiments of the present disclosure could have different modifications and changes. Any amendments, equivalent substitutions and improvements, as long as they are within the spirits and principles of the embodiments of the present disclosure, should be included in the protection scope of the embodiments of the present disclosure.

Although embodiments of the present disclosure have been described with reference to multiple examples, it should be appreciated that embodiments of the present disclosure are not limited to the disclosed examples. The embodiments of the present disclosure aim to encompass all kinds of amendments and equivalent arrangements within the spirits and scope of the attached claims. The attached claims comply with the broadest interpretation, so as to comprise all amendments, equivalent structures and functions.

We claim:

1. A method for rebuilding a redundant array of independent disks (RAID), comprising:
    in response to detecting a failure of a disk, dividing a RAID group including the disk into a plurality of stripes covering all of the RAID group, each stripe including a disk slice across all disks of the RAID group;
    mapping the plurality of stripes to other RAID groups; and
    rebuilding, in the other RAID groups, data on the plurality of stripes of the RAID group.

2. The method of claim 1, wherein the dividing a RAID group including the disk into a plurality of stripes comprises:
    dividing the RAID group into the plurality of stripes according to a predetermined size of a stripe.

3. The method of claim 1, wherein the mapping the plurality of stripes to other RAID groups comprises:
    mapping the plurality of stripes to the other RAID groups based on a workload and a remaining storage space of each of the other RAID groups.

4. The method of any of claim 1, wherein the rebuilding in the other RAID groups data on the plurality of stripes in the RAID group comprises:

rebuilding the plurality of stripes in parallel in a plurality of RAID groups of the other RAID groups.

5. The method of claim 1, wherein the rebuilding in the other RAID groups data on the plurality of stripes in the RAID group comprises:
 rebuilding the plurality of stripes in the RAID group segment by segment; and
 setting a check point to record a progress of the rebuilding.

6. A method for rebuilding a redundant array of independent disks (RAID), comprising:
 in response to detecting a failure of a disk, dividing a RAID group including the disk into a plurality of stripes, each stripe including a disk slice across all disks of the RAID group;
 mapping the plurality of stripes to other RAID groups; and
 rebuilding, in the other RAID groups, data on the plurality of stripes of the RAID group, wherein the rebuilding in the other RAID groups data on the plurality of stripes in the RAID group comprises:
  in response to determining that a specific stripe of the plurality of stripes is being rebuilt, providing a read operation for the specific stripe in the RAID group without providing a write operation for the specific stripe.

7. The method of claim 6, wherein the rebuilding in the other RAID groups data on the plurality of stripes in the RAID group comprises:
 redirecting both read and write operations for the specific stripe to a specific RAID group rebuilding the specific stripe after the specific stripe is rebuilt.

8. A method for rebuilding a redundant array of independent disks (RAID), comprising:
 in response to detecting a failure of a disk, dividing a RAID group including the disk into a plurality of stripes, each stripe including a disk slice across all disks of the RAID group;
 mapping the plurality of stripes to other RAID groups;
 rebuilding, in the other RAID groups, data on the plurality of stripes of the RAID group; and
 in response to all of the plurality of stripes having been rebuilt, replacing the failed disk with a spare disk to form a new spare RAID group that is empty.

9. The method of claim 8, further comprising:
 load balancing the other RAID groups after forming the new spare RAID group.

10. The method of claim 9, wherein the load balancing the other RAID groups comprises:
 migrating a portion of data of a specific group of the other RAID groups which has a high load to the new spare group of RAID.

11. The method of claim 10, wherein the migrating a portion of data of a specific group of the other RAID groups which has a high load to the new spare group of RAID comprises:
 determining the specific group of RAID of the other RAID groups which has the high load by recording, in each of the other RAID groups, counts of at least one of a read operation or a write operation.

12. An apparatus for rebuilding a redundant array of independent disks (RAID), comprising:
 a dividing unit configured to, in response to detecting a failure of a disk, divide a RAID group including the disk into a plurality of stripes covering all of the RAID group, each stripe including a disk slice across all disks of the RAID group;
 a mapping unit configured to map the plurality of stripes to other RAID groups; and
 a rebuilding unit configured to rebuild, in the other RAID groups, data on the plurality of stripes of the RAID group.

13. The apparatus of claim 12, wherein the dividing unit is further configured to:
 divide the RAID group into the plurality of stripes according to a predetermined size of a stripe.

14. The apparatus of claim 12, wherein the mapping unit is further configured to:
 map the plurality of stripes to the other RAID groups based on a workload and a remaining storage space of each of the other RAID groups.

15. The apparatus of claim 12, wherein the rebuilding unit is further configured to:
 in response to determining that a specific stripe of the plurality of stripes is being rebuilt, provide a read operation for the specific stripe in the RAID group without providing a write operation for the specific stripe.

16. The apparatus of claim 15, wherein the rebuilding unit is further configured to:
 redirect both read and write operations for the specific stripe to a specific RAID group rebuilding the specific stripe after the specific stripe is rebuilt.

17. The apparatus of any of claim 12, wherein the rebuilding unit is further configured to:
 rebuild the plurality of stripes in parallel in a plurality of RAID groups of the other RAID groups.

18. The apparatus of claim 12, wherein the rebuilding unit is further configured to:
 rebuild the plurality of stripes in the RAID group segment by segment; and
 set a check point to record a progress of the rebuilding.

19. The apparatus of claim 12, further comprising:
 a replacing unit configured to, in response to all of the plurality of stripes having been rebuilt, replace the failed disk with a spare disk to form a new spare RAID group that is empty.

20. The apparatus of claim 19, further comprising:
 a load balancing unit configured to load balance the other RAID groups after forming the new spare RAID group.

* * * * *